Sept. 22, 1953  A. F. CRONE  2,652,752
ROAD JOINT CONNECTION
Filed April 5, 1950
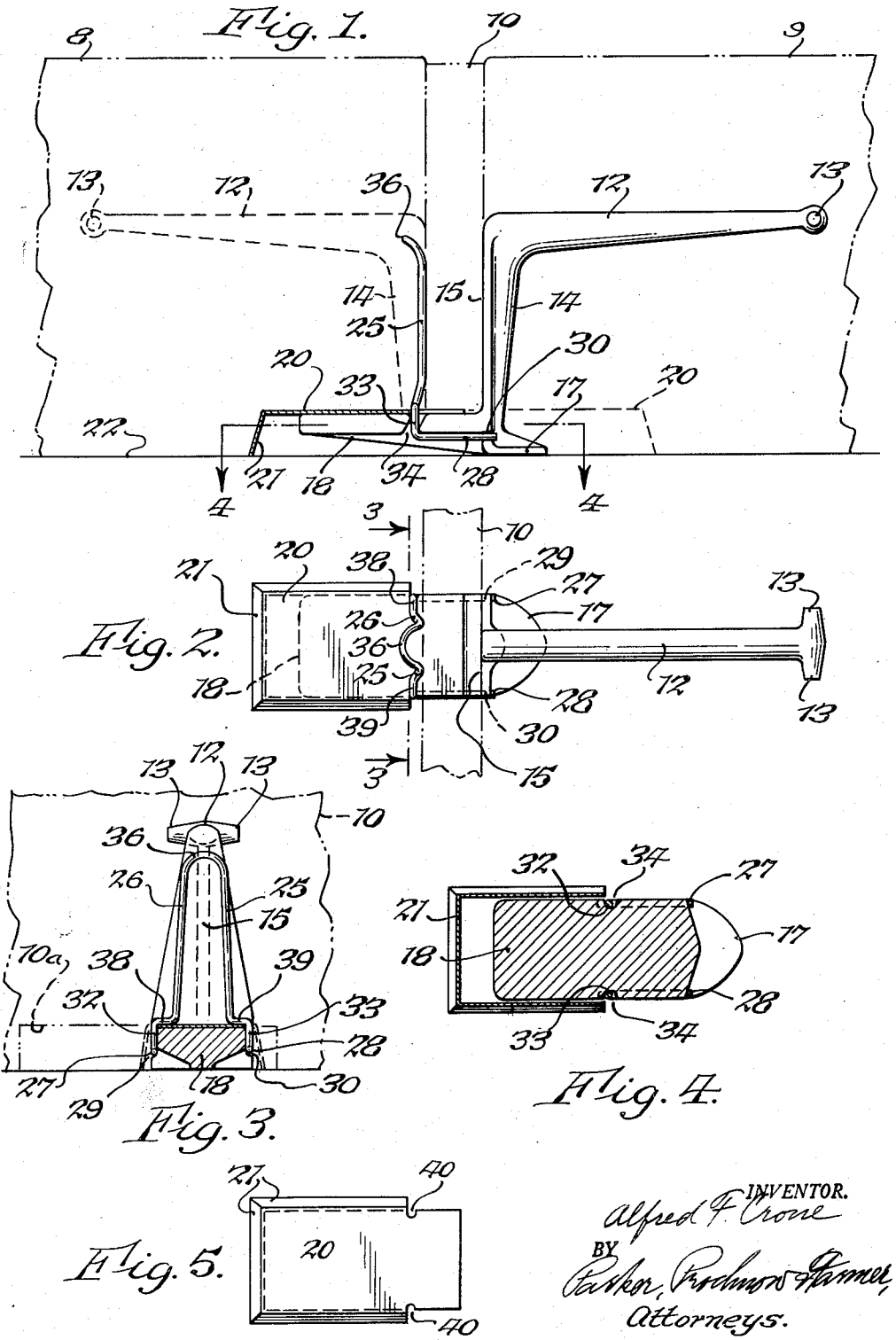
INVENTOR.
Alfred F. Crone
BY
Parker, Prodmon & Hanner,
Attorneys.

Patented Sept. 22, 1953

2,652,752

UNITED STATES PATENT OFFICE 2,652,752

ROAD JOINT CONNECTION

Alfred F. Crone, Kenmore, N. Y., assignor to Acme Steel & Malleable Iron Works, Buffalo, N. Y.

Application April 5, 1950, Serial No. 154,024

6 Claims. (Cl. 94—8)

This invention relates to improvements in joint supports of the type used in highway construction between the adjacent ends of pavement slabs to keep the ends in alinement.

One of the objects of this invention is to provide joint supports which can be readily applied to the filler or expansion joint member and held thereon by resilient means, thus eliminating the need for bolts or other fastening devices for holding the joint supports in correct relation to each other. Another object is to provide a joint support which is so constructed that it can be completely assembled in the shop in which the joint support is produced, so that no assembly work need be done at the location where the road is under construction. It is also an object of this invention to provide each joint support with a spring clamping member mounted on the joint support in such a manner that the joint filler is merely inserted between a part of the joint support and the clamping member and is thus resiliently held in place on the joint filler. A further object is to provide a spring clamping member which serves the two-fold purpose of securing the usual metal cover on the supporting member of the joint support and which serves to yieldingly hold the joint support on the joint filler. A further object is to provide a spring member for a joint support which by its own resilience holds itself in engagement with the joint support and also holds the joint support on the joint filler.

Other objects and advantages will be apparent from the following description of one embodiment of the invention and the novel features will be particularly pointed out hereinafter in connection with the appended claims.

In the accompanying drawings:

Fig. 1 is an elevation of a joint support embodying this invention showing the same in operative relation to a joint filler and to adjacent pavement slabs.

Fig. 2 is a top plan view thereof.

Fig. 3 is a sectional elevation thereof, on line 3—3, Fig. 2.

Fig. 4 is a sectional plan view thereof, on line 4—4, Fig. 1.

Fig. 5 is a top plan view of a cover for the supporting member or foot portion of the joint support.

In the accompanying drawings, I have shown in broken lines in Fig. 1, the ends of two adjacent pavement slabs 8 and 9 between which a joint filler 10 is arranged to permit expansion and contraction of the pavement slabs. These joint fillers may be made of any suitable resilient or compressible material, and in the construction of the pavement the concrete or other paving material is poured or formed into direct contact with the joint filler. The pavement slabs 8 and 9 are laid on the usual subgrade (not shown).

The joint supports are employed mainly for the purpose of keeping the two pavement slabs in alinement with each other and preventing movement of one slab relatively to the other due to any cause, such as the movement of vehicle wheels from one of the slabs to the other, or due to shifting of the slabs.

The joint supports shown each include an anchoring member 12 which extends approximately in a horizontal direction and is embedded in the end portion of a pavement slab during the pouring or forming of the same. This anchoring member may be provided with projections extending transversely of the length thereof, such for example as the projections 13 arranged at the outer end of the anchoring member 12.

The other end of the anchoring member terminates in a downwardly extending abutment member 14 having a face 15 thereof formed to lie in contact with one face of the joint filler 10. The abutment member terminates at its lower end in a toe portion 17 extending underneath the anchoring member 12 and below one of the pavement slabs, and in a supporting member 18 extending in the opposite direction from the toe portion 17, so as to lie below the other pavement slab. The supporting member 18 may be of any suitable construction and is of sufficient length and width to provide a secure bearing on the undersurface of the slab with which it cooperates. It will be noted that the supporting member 18 forms a continuation of the toe portion 17. The joint filler 10 is provided at intervals lengthwise thereof with upwardly extending notches or recesses 10a, Fig. 3, into which supporting members 18 of a pair of oppositely disposed joint supports extend.

As a result of the construction described, it will be noted that in a completed pavement the joint support shown in full lines in Fig. 1 is securely anchored by means of the anchoring member 12 in the slab 9 and if this slab tends to raise relatively to the slab 8, the supporting member 18 bearing on the undersurface of the slab 8 will prevent raising of the slab 9 relatively to the slab 8. In a similar manner, the other anchoring member which is shown in broken lines is anchored in the slab 8 and the supporting member 18 thereof underlying the slab 9 will prevent raising of the slab 8 relatively to the slab 9. The cooperating pairs of joint supports arranged at intervals along the joint, consequently, maintain the ends of adjacent slabs in alinement. It is important to note that due to the fact that the toe portions 17 and the supporting members 18 of the joint supports form a single member or part extending under both adjacent slabs, the toe portion will resist bending of the supporting member relatively to the abutment member 14, when the slab 9 tends to rise relatively to the slab 8. Consequently, when this condition exists, the supporting member 18 will be subjected mainly to shear, and since the joint supports have a much higher resistance to shear than to bending, a secure connection between the adjacent slabs results from the construction described.

In connection with joint supports of this type a cover or guard shoe is provided which overlies the supporting member. The cover or guard shoe shown in the drawings includes a substantially flat upper part or web 20 having downwardly extending flanges 21 on three sides thereof which extend downwardly preferably into contact with the upper surface 22 of the subgrade and the cover extends beyond the outer end of the supporting member 18. When concrete or other paving material is poured to form the slabs 8 and 9, it will be noted that a cavity is formed underneath the cover or guard shoe. This guard shoe is preferably made of relatively thin sheet metal of sufficient strength to prevent the road material from entering the cavity formed underneath the same and thereafter if the cover or guard shoe rusts or disintegrates, no harm will be done. The cavity formed underneath the cover permits the supporting member 18 to move horizontally in the cavity relatively to the overlying slab during contraction and expansion of the slabs 8 and 9.

In order to hold the joint supports in correct relation to the joint filler 10, so that they will be correctly embedded in the slabs 8 and 9, I have provided each joint support with a clamping member formed to engage the face of the joint filler 10 opposite to that engaged by the face 15 of the joint support. The clamping member in the particular construction illustrated by way of example is in the form of a spring which may be made of spring wire, the lower portion of which is suitably secured to the supporting member 18 of the joint support, and the upper portion of which extends upwardly in position to contact with the joint filler 10. In the particular construction shown, the clamping member is of approximately inverted U-shape including a pair of legs 25 and 26 integrally connected to each other at their upper ends. The lower ends of the two legs terminate in approximately horizontal end or foot portions 27 and 28 which serve to secure the clamping member to the joint support in any suitable manner so as to support the legs 25 and 26 in positions to press against the filler 10. In the particular construction shown for this purpose, the base 13 of the abutment member 14 of the joint support is provided at opposite sides thereof with substantially horizontally extending recesses 29 and 30 into which the horizontally extending portions 27 and 28 of the clamping member fit. The spring clamping member shown is so formed that the legs 25 and 26 thereof are biased so that the lower ends or foot portions thereof are urged toward each other. Consequently, in order to apply the clamping member to the supporting member 18, it is necessary to spread the legs 25 and 26 apart to a slight extent so that the lower ends thereof may straddle the supporting member 18, with the foot portions extending below the side edges of the supporting member 18 and the outer ends of the foot portions extending under shoulders 29 and 30. The resilience of this clamping member will then hold the horizontally extending foot portions 27 and 28 thereof yieldingly under the shoulders formed below laterally projecting portions or edges of the supporting member 18. These foot portions may be otherwise secured to the supporting member 18.

The horizontally extending lower ends or foot portions of the legs 25 and 26 terminate in upwardly extending parts 32 and 33 and the sides of the supporting member 18 are provided with upwardly extending grooves or recesses 34 formed to receive the parts 32 and 33. These upwardly extending parts, consequently, are also yieldingly held in the upwardly extending grooves 34, and the grooves 34 hold the clamping member or spring against lengthwise movement relatively to the supporting member or part 18. The upwardly extending legs 25 and 26 of the clamping member are so formed that when the clamping member is correctly positioned on the joint support, these legs will bear against the side joint filler and exert a yielding pressure on the joint filler in a direction to urge the same against the face 15 of the joint support. Consequently, when joint supports of the type described are correctly positioned on the joint filler 10, the joint supports will be yieldingly held on the joint filler with sufficient force to prevent them from dropping from the joint filler or becoming dislodged while the filler is positioned on the subgrade. The joint supports may, consequently, be positioned on the joint filler by sliding them upwardly so that the joint filler will be arranged between the clamping member and the face 15 of the joint support. In order to facilitate this positioning of the joint support on the filler, the upper end of the clamping member or spring at the juncture of the two legs 25 and 26 is preferably bent outwardly away from the face 15 as shown at 36 so that the joint filler may readily be inserted into the space between the clamping member and the face 15 of the abutment member.

I have also provided the clamping member with means for holding the cover or guard shoe in place on the supporting member 18 of the joint support. In the construction shown for this purpose, the upwardly extending legs 25 and 26 are connected with the upwardly extending parts 32 and 33 of the clamping member by means of substantially horizontally inwardly extending portions 38 and 39. These inwardly extending parts 38 and 39 will, consequently, overlie the upper flat surface 20 of the cover or guard shoe so as to hold the same against upward movement relatively to the supporting member 18. In order to also enable the clamping member or spring to hold the cover or guard shoe against lengthwise movement relatively to the supporting member, the upper part 20 of the guard shoe is provided at opposite side edges thereof with notches or recesses 40 into which the upwardly extending parts 32 and 33 of the clamping member extend.

The clamping member or spring described, consequently, serves the purposes of holding the joint support in correct relation to the joint filler, of greatly facilitating the application of the joint supports to the filler member, and of holding the covers or guard shoes on the joint supports. The assembly of the joint supports described is also greatly facilitated, since it is merely necessary to place a cover or guard shoe into its operative position on the supporting member 18 and then spread apart the legs of a clamping member or spring so that the parts of the legs fit into the grooves provided in the base of the joint support and the slots 40 of the cover or guard shoe. Upon then releasing the legs of the spring, they will automatically hold themselves on the joint support and also secure the cover or guard shoe on the supporting member 18 of the joint support. The construction described, consequently, eliminates the necessity of providing bolts for securing the joint supports to the joint filler and to each other, and the provision of holes in the joint filler and corresponding holes in the joint supports through which the bolts may extend. The joint supports may, consequently, be arranged and yieldingly secured on the joint filler in any desired position. The joint supports are generally arranged in pairs with the two joint supports of a pair in close proximity to each other with their anchoring members extending in opposite directions and identical joint supports may be used on either side of the joint filler. The pairs of joint supports may, consequently, be arranged at intervals lengthwise of the joint filler as may be required. The application of the joint supports to a joint filler is usually done at or near the location where the joint fillers are to be used and the joint supports described can be easily and quickly applied to the joint fillers without requiring the use of tools of any kind.

The fact that the toe portion 17 is formed in one piece with the supporting member, and thus causes the supporting member to be subjected mainly to shear when one pavement slab tends to rise relatively to the adjacent slab, results in a very strong and reliable joint support.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. In a joint support for a road joint between two adjacent pavement slabs and separated by a joint filler, said joint support including an anchoring member extending in a direction to be embedded in one of said slabs, an abutment member extending downwardly from said anchoring member to abut against one face of the joint filler, a supporting member integral with the lower end of said abutment member and adapted to extend below said filler and a part of the other slab, and a cover member covering said supporting member, that improvement which includes a clamping spring having one end thereof secured to said support, a part of said clamping spring above said end having a bend extending over said cover member for holding the same in correct relation to said supporting member, said clamping spring having an upwardly extending part arranged in spaced relation to said abutment member to form a space into which said filler may be inserted for holding said joint support on said filler.

2. In a joint support for a road joint between two adjacent pavement slabs and separated by a joint filler, said joint support including an anchoring member extending into position to be embedded in one of said slabs, an abutment member extending downwardly from said anchoring member and extending into position to abut against one face of the joint filler, and a supporting member formed integral with the lower end of said abutment member and adapted to extend below said filler and a part of the other slab, that improvement which includes a cover member covering said supporting member, a clamping member extending upwardly from said supporting member in spaced relation to said abutment member to form a space into which said joint filler may be inserted, said clamping member also having a part engaging said cover member for holding the same downwardly against the upper face of said supporting member, an interlocking connection between the lower portion of said joint support and said clamping member for supporting said clamping member in substantially upright position to yieldingly engage said joint filler, and interlocking parts on said cover member and said clamping member for holding said cover member against lengthwise movement of said supporting member.

3. In a joint support for a road joint between two adjacent pavement slabs, separated by a joint filler, said joint support including an anchoring member extending into position to be embedded in one of said slabs, an abutment member extending downwardly from said anchoring member and extending into position to abut against one face of the joint filler, and a supporting member formed integral with the lower end of said abutment member and adapted to extend below said filler and a part of the other slab, that improvement which includes a cover member covering said supporting member, a clamping spring which comprises a pair of legs integrally connected at their upper ends and extending in substantially parallel spaced relation to said abutment member to form a space into which said joint filler may be inserted, the lower ends of said legs of said clamping spring extending into engagement with the lower portion of said joint support, said lower portion of said joint support being provided with recesses in the sides thereof into which the lower portions of said clamping spring extend, said joint support also having shoulders under which the lower ends of said springs extend to hold said clamping spring in correct relation to said joint support, parts on said legs extending over the upper surface of said cover for holding the same on said supporting member, and a part on said cover member engaging the lower ends of said clamping spring to hold said cover against movement relatively to said supporting member.

4. A joint support according to claim 3, in which said cover member has notches in the opposite sides thereof into which the lower portions of said legs extend to hold said cover member against movement lengthwise of said supporting member.

5. In a joint support for a road joint between two adjacent pavement slabs and separated by a joint filler, said joint support including an anchoring member extending into position to be embedded in one of said slabs, an abutment member extending downwardly from said anchoring member and having a face to abut against one face of the joint filler, and a supporting member integral with the lower end of said abutment member and adapted to extend below said filler and a part of the other slab, that improvement which includes a clamping spring having the lower part thereof secured to said supporting member and having an upwardly extending portion arranged in spaced relation to said face of said abutment member and forming with said abutment member a space into which a joint filler may be inserted, said clamping spring being of inverted substantially U-shape, said joint support having upwardly extending recesses therein in which the lower end portions of said clamping springs are seated, and shoulders against which the lower ends of the legs of the clamping spring bear for holding the clamping spring in correct relation to said support.

6. A joint support according to claim 5, in which said clamping spring is biased to urge the lower ends of said legs toward each other to seat in said recesses of said joint support, said clamping spring being also biased to urge the upper part thereof into yielding engagement with said other face of said filler.

ALFRED F. CRONE.

References Cited in the file of this patent

UNITED STATES PATENTS

| Number | Name | Date |
|---|---|---|
| 2,283,787 | Brickman | May 19, 1942 |
| 2,319,049 | Fischer | May 11, 1943 |
| 2,319,513 | Parker | May 18, 1943 |